United States Patent
Jacobs et al.

(10) Patent No.: US 10,796,290 B2
(45) Date of Patent: Oct. 6, 2020

(54) SYSTEMS AND METHODS FOR FACILITATING A TRANSACTION USING AUGMENTED REALITY

(71) Applicant: CAPITAL ONE SERVICES, LLC, McLean, VA (US)

(72) Inventors: Drew Jacobs, Arlington, VA (US); Justin Wishne, Chicago, IL (US); Karen Nickerson, Chicago, IL (US); Justin Smith, Chicago, IL (US); Marco S. Giampaolo, Berwyn, IL (US); Hannes Jouhikainen, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 126 days.

(21) Appl. No.: 15/664,749

(22) Filed: Jul. 31, 2017

(65) Prior Publication Data
US 2018/0181926 A1 Jun. 28, 2018

Related U.S. Application Data

(60) Provisional application No. 62/437,699, filed on Dec. 22, 2016.

(51) Int. Cl.
*G06Q 30/02* (2012.01)
*G06Q 20/10* (2012.01)
(Continued)

(52) U.S. Cl.
CPC ............ *G06Q 20/10* (2013.01); *G06F 3/011* (2013.01); *G06K 9/00671* (2013.01);
(Continued)

(58) Field of Classification Search
CPC ......... G06F 17/30247; G06F 17/30256; G06F 17/30268
(Continued)

(56) References Cited

U.S. PATENT DOCUMENTS 8,380,177 B2 * 2/2013 Laracey ............. G06Q 30/0253
455/414.1
8,606,645 B1 * 12/2013 Applefeld ............. G06T 19/006
705/14.25
(Continued)

OTHER PUBLICATIONS

N. Wiwatwattana, S. Sukaphat, T. Putwanpen, S. Thongnuch and P. Kanokudomsin, "Augmenting for purchasing with mobile: Usage and design scenario for ice dessert," IISA 2014, The 5th International Conference on Information, Intelligence, Systems and Applications, Chania, 2014, pp. 446-450. (Year: 2014).*
(Continued)

*Primary Examiner* — Alexander G Kalinowski
*Assistant Examiner* — John O Preston
(74) *Attorney, Agent, or Firm* — Troutman Pepper Hamilton Sanders LLP; Christopher J. Forstner; John A. Morrissett

(57) ABSTRACT

A system includes one or more memory devices storing instructions, and one or more processors configured to execute the instructions to perform steps of a method. The system may provide an augmented environment that facilitates a transaction. The system may store profile data including user payment or user profile information. The system may then receive environmental data, and identify one or more action items in the environmental data. In response to this identification, the system may augment the environmental data by adding virtual environmental data, and then provide this virtual environmental data to a device to create an augmented environment. The system can then receive
(Continued)

user input data, and provide purchase request data to a merchant terminal in response to those inputs.

18 Claims, 5 Drawing Sheets

(51) Int. Cl.
  *G06K 9/00* (2006.01)
  *G06Q 10/08* (2012.01)
  *G06F 3/01* (2006.01)
  *G06Q 20/20* (2012.01)
  *G06Q 30/06* (2012.01)
  *G06T 11/60* (2006.01)
  *G06F 3/16* (2006.01)
  *G06F 3/03* (2006.01)
  *G06K 9/18* (2006.01)

(52) U.S. Cl.
  CPC ............ *G06Q 10/087* (2013.01); *G06Q 20/20* (2013.01); *G06F 3/017* (2013.01); *G06F 3/0304* (2013.01); *G06F 3/167* (2013.01); *G06K 9/183* (2013.01); *G06T 11/60* (2013.01); *G06T 2200/24* (2013.01)

(58) Field of Classification Search
  USPC .......................................................... 345/633
  See application file for complete search history.

(56) References Cited

U.S. PATENT DOCUMENTS

2003/0210228 A1* 11/2003 Ebersole .............. G02B 27/017
 345/157
2014/0100997 A1* 4/2014 Mayerle ............ G06Q 30/0643
 705/27.2

OTHER PUBLICATIONS

S. Guven, O. Oda, M. Podlaseck, H. Stavropoulos, S. Kolluri and G. Pingali, "Social mobile Augmented Reality for retail," 2009 IEEE International Conference on Pervasive Computing and Communications, Galveston, TX, 2009, pp. 1-3. (Year: 2009).*

P. K. V. Jayananda, et al, "Augmented Reality Based Smart Supermarket System with Indoor Navigation using Beacon Technology (Easy Shopping Android Mobile App)," 2018 IEEE International Conference on Information and Automation for Sustainability (ICIAfS), Colombo, Sri Lanka, 2018, pp. 1-6. (Year: 2018).*

* cited by examiner

SYSTEMS AND METHODS FOR FACILITATING A TRANSACTION USING AUGMENTED REALITY

CROSS-REFERENCE TO RELATED APPLICATION

This application claims the benefit of U.S. Provisional Application No. 62/437,699, filed 22 Dec. 2016, the entire contents and substance of which is hereby incorporated by reference.

FIELD OF INVENTION

The present disclosure relates to systems and methods for facilitating a transaction using augmented reality, and more particularly using an interactive augmented environment.

BACKGROUND

Often, while moving through the world, people see things that remind them of transactions they would like to or need to complete. For example, a person may be opening mail and be reminded of a cable bill due. As another example, a person may be looking in a cabinet or refrigerator and be made aware of or reminded that an item is running low or absent. Typically, in situations such as these, a person needs to remember the task they wish to complete, and then go to a store or to a computer terminal connected to an appropriate merchant.

However, it is not always easy to keep track of these tasks, nor is it always practical to go to a store. It is quite common for a person to forget the listing of items they intended to purchase, or to put off paying a bill and forgetting it in a pile of junk mail. At present there are some methods and applications such as grocery subscription services or task reminders to help address these issues; however they still require time to set-up and monitor.

Accordingly, there is a need for systems and methods for facilitating a transaction using augmented reality. Such systems can be non-invasive to an individual's day and can provide the ability to complete transactions instantaneously. Embodiments of the present disclosure are directed to this and other considerations.

SUMMARY

Disclosed embodiments provide systems and methods for facilitating a transaction using augmented reality.

Consistent with the disclosed embodiments, the system may include one or more memory devices storing instructions, and one or more processors configured to execute the instructions to perform steps of a method to facilitate a transaction using augmented reality. The system may store profile data including user payment or other profile information. The system may then receive environmental data, and identify one or more action items in the environmental data. In response to this identification, the system may augment the environmental data by adding virtual environmental data, and then provide this virtual environmental data to a device. The system can then receive user inputs, and provide purchase request data to a merchant terminal in response to those inputs.

Consistent with the disclosed embodiments, methods for providing an augmented environment that facilitates a transaction are also provided.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
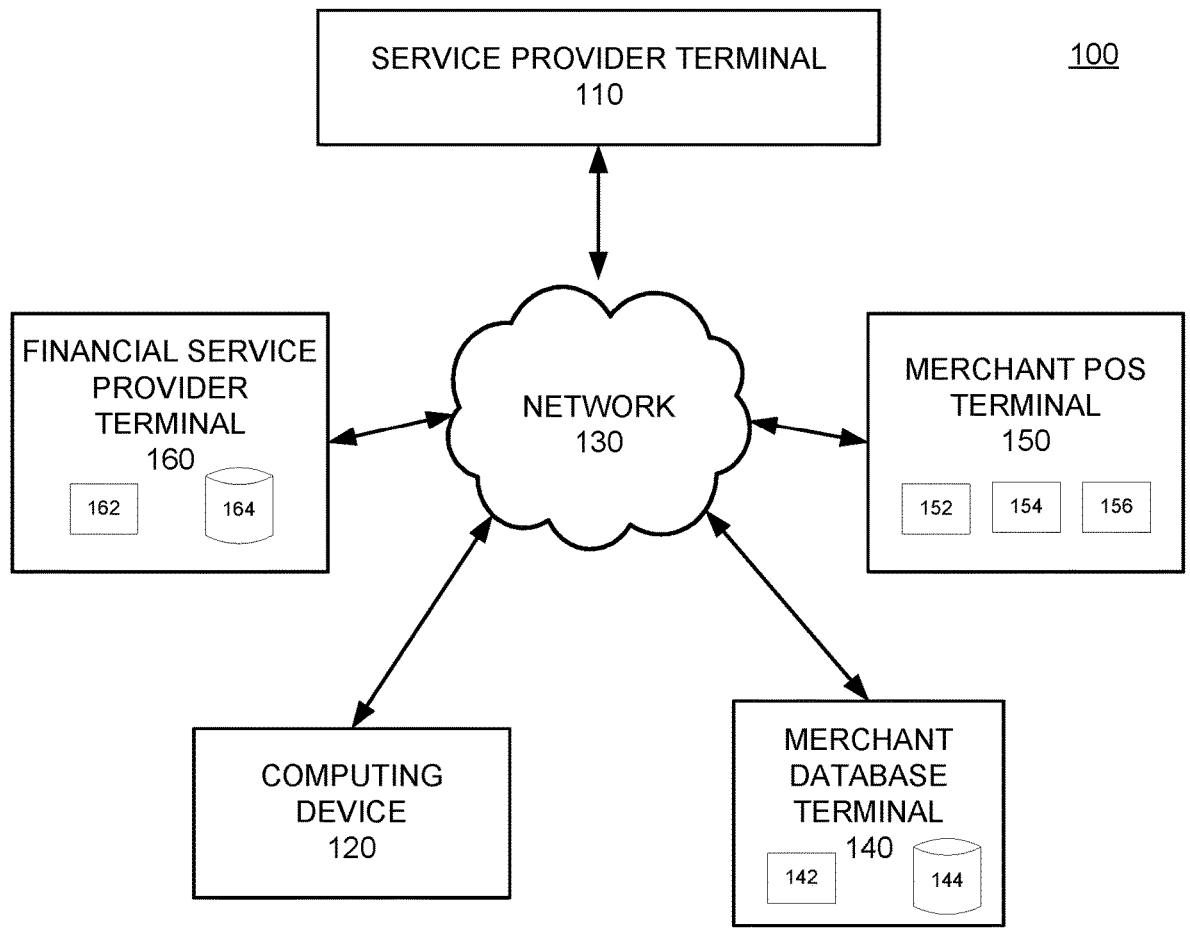
FIG. 1 is a diagram of an exemplary system that may be used to generate an augmented environment and facilitate a transaction.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for generating an augmented environment and facilitating a transaction. The system may include one or more memory devices storing instructions, and one or more processors configured to execute the instructions to perform steps of a method. Specifically, in some embodiments, the system may provide an augmented environment that facilitates a transaction. To accomplish this, the system may execute the instructions to store profile data including user payment or other profile information. The system may then receive environmental data, and identify one or more action items in the environmental data. In response to this identification, the system may augment the environmental data by adding virtual environmental data, and then provide this virtual environmental data to a device. Having provided the virtual data to the computing device, the system may then receive user inputs in response to the virtual environment. With this user input data, the system can provide purchase request data to a merchant terminal to complete a transaction.

In another embodiment, a system for facilitating a transaction may include a memory for storing profile data comprising user payment credentials and user profile information. The system may include an environmental data sensor for obtaining environmental data comprising audio and/or visual information representing a physical environment. The system may include an input/output device for receiving virtual environmental data comprising data associated with a merchant from a computing device. The system may further include an augmented environment processor that, based on environmental data obtained from the environmental data sensor, may identify one or more action items in the environmental data, augment the environmental data by adding the virtual environmental data comprising enhanced content associated with one or more of the one or more action items, and generate a signal comprising augmented environmental data. Enhanced content may be content that is unrepresented in the physical environment. The system may further include an augmented environmental data display that may receive the signal comprising augmented environmental data and display said augmented environmental data in accordance with said signal and a user interface device for receiving user input data associated with one or more action items.

In another aspect, a non-transitory computer-readable medium storing instructions is disclosed. The instructions, when executed by one or more processors, may cause a computing device to perform steps of a method for generating an augmented environment and facilitating a transaction. Specifically, the computing device may store profile data including user payment or other profile information and receive environmental data. The computing device may then identify one or more action items in the environmental data. This identification can result in the system augmenting the environmental data by adding virtual environmental data, and then providing this virtual environmental data to a device. The system may then provide purchase request data to a merchant terminal to complete a transaction in response to user inputs received from the device.

In another aspect, a method of facilitating a transaction is disclosed. The disclosed method can include storing profile data comprising user payment credentials and user profile information, and receiving environmental data from a computing device associated with the stored profile data comprising audio and visual information representing a physical environment. Next, the method can include identifying one or more action items in the environmental data, and augmenting the environmental data by adding virtual environmental data comprising enhanced content associated with one or more of the one or more action items. The method can further include providing the virtual environmental data to the computing device to create an augmented environment in combination with the physical environment. The method can then include receiving user input data associated with one or more of the action items from the computing device, and then providing purchase request data to a merchant terminal to enable a transaction related to the one or more action items.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system that may be configured to perform one or more processes that can generate interactive virtual elements to augment an environment. The components and arrangements shown in FIG. 1 are not intended to limit the disclosed embodiments as the components used to implement the disclosed processes and features may vary.

In accordance with disclosed embodiments, transaction facilitating system 100 may include a service provider terminal 110 in communication with a computing device 120 via network 130. In some embodiments, service provider terminal 110 is also in communication with a merchant database terminal 140 via network 130. Computing device 120 may include a mobile computing device (e.g., a smart phone, tablet computer, smart wearable device, portable laptop computer, voice command device, or other mobile computing device) or a stationary computing device (e.g., a stationary desktop or other stationary computer). Computing device 120 may belong to or be provided by a consumer, or may be borrowed, rented, or shared. In some embodiments, computing device 120 may be configured to provide one or more of an augmented reality and a virtual reality experience to one or more users, and may be equipped with a visual display, speakers or other auditory devices, tactile simulators, and other devices configured to engage the user's senses to enhance the augmented/virtual reality experience.

In some embodiments, transaction facilitating system 100 may connect to a merchant database terminal 140 that communicates with other devices of system 100 via network 130. Optionally, in some embodiments, interactive virtual/augmented environment system 100 may also include a merchant point of sale (POS) terminal 150 that communicates with other devices of system 100 via network 130. Additionally, in some embodiments, interactive virtual/augmented environment system 100 may also include a financial service provider terminal 160 that communicates with other devices of system 100 via network 130.

Network 130 may be of any suitable type, including individual connections via the internet such as cellular or WiFi networks. In some embodiments, network 130 may connect terminals using direct connections such as radio-frequency identification (RFID), near-field communication (NFC), Bluetooth™, low-energy Bluetooth™ (BLE), WiFi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
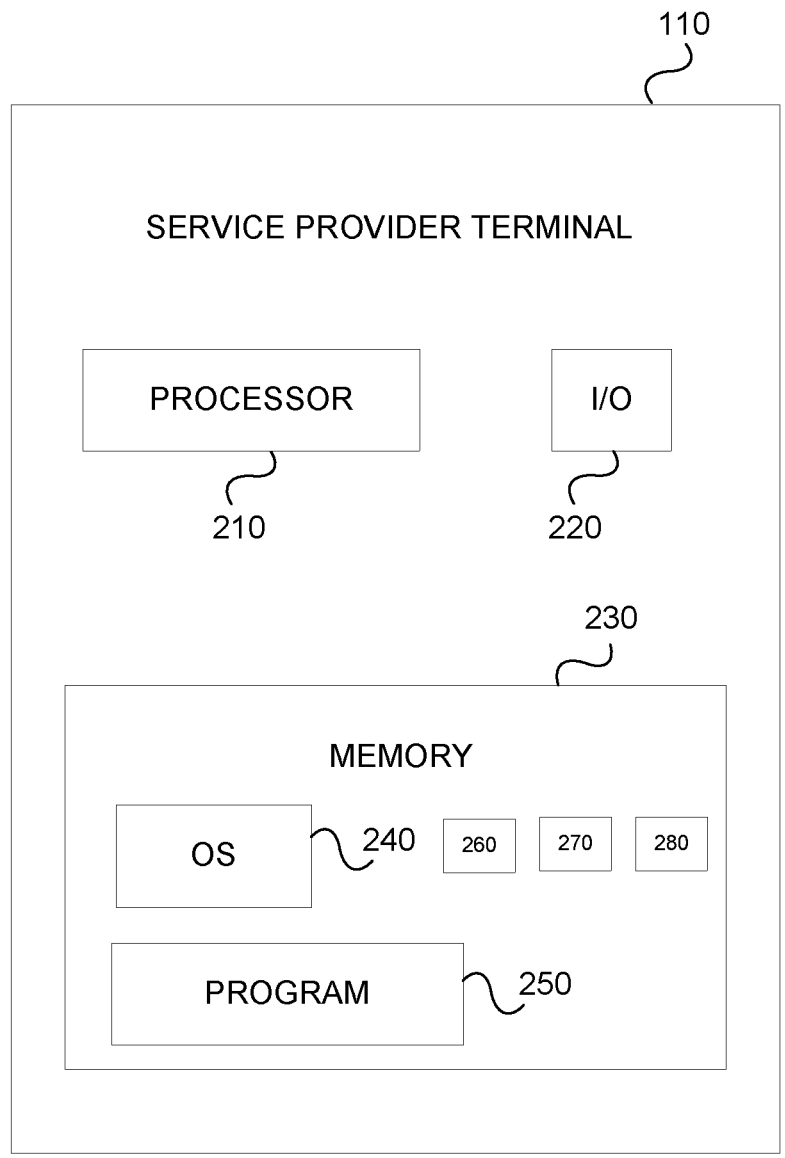
FIG. 2 is a component diagram of an exemplary service provider terminal.

An exemplary embodiment of service provider terminal 110 is shown in more detail in FIG. 2. Computing device 120, merchant database terminal 140, merchant POS terminal 150, and financial service provider terminal 160 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, the service provider terminal 110 may further include a peripheral interface, a transceiver, a mobile network interface in communication with the processor 210, a bus configured to facilitate communication between the various components of the service provider terminal 110, and a power source configured to power one or more components of the service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™ Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a merchant information database 260, an environment database 270, and a virtual environmental database 280 for storing related data to enable service provider terminal 110 to perform one or more of the processes and functionalities associated with the disclosed embodiments. Merchant information database 260 may include stored data relating to product price, product inventory, related products, and available discounts associated with one or more products associated with one or more merchants. Environment database 270 may include stored data relating to a physical environment that is captured by one or more devices (e.g., computing device 120) of system 100. Virtual environment database 280 may include stored data relating to a virtual environment that is provided to and can be updated based upon interactions with one or more devices (e.g., computing device 120) of system 100.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider terminal 110 may also include one or more I/O devices 220 that may comprise one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as via computing device 120).

In exemplary embodiments of the disclosed technology, service provider terminal 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Merchant database terminal 140 may have one or more processors 142 and one or more merchant databases 144, which may be any suitable repository of merchant data. Merchant database terminal 140 may be located at the POS location, off-site at another merchant location, or at a third party location. Information stored in merchant database terminal 140 may be accessed (e.g., retrieved, updated, and added to) via network 130 by one or more devices (e.g., service provider terminal 110) of system 100. In other embodiments, merchant POS terminal 150 may be configured to process online transactions on behalf of the associated merchant. Merchant database 144 may store information relating to products and services offered by merchants such as pricing, quantity, availability, discounts, reviews, and any other such generally available information that a consumer may utilize in making a purchasing decision. In some embodiments, merchant database 144 may also include location information associated with products and services that identifies the location(s) that a particular product or service is available for purchase. In some embodiments, the location information may include an identification of a particular store, terminal, or kiosk that the product or service may be purchased from.

Merchant POS terminal 150 may have one or more POS devices 152, 154, 156 that communicate with one or more devices (e.g., computing device 120) of system 100 via network 130. In some embodiments, POS devices 152, 154, 156 may be associated with one or more products or items at a POS location, and may serve as beacons to identify the associated products or items and related information to one or more devices of system 100.

Figure 5:
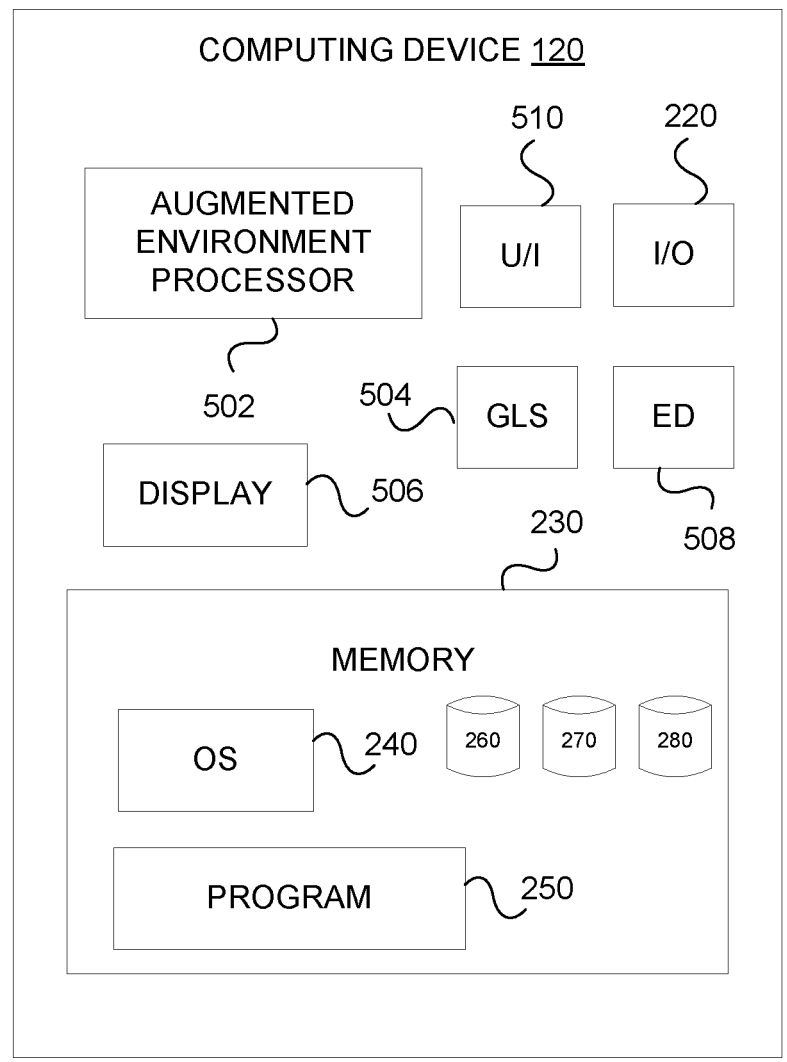
FIG. 5 is a component diagram of an exemplary computing device.

FIG. 5 shows an exemplary embodiment of computing device 120. As shown, computing device 120 may include input/output ("I/O") device 220 for receiving virtual environmental data comprising data associated with a merchant from a computing device, memory 230 containing operating system ("OS") 240 and program 250 and all associated components as described above with respect to service provider terminal 110. Computing device 120 may also have one or more processors, including an augmented environment processor 502 for generating signals representative of augmented and/or virtual environments, a geographic location sensor ("GLS") 504 for determining the geographic location of computing device 120 and/or an associated environmental data sensor 508, an augmented environmental data display 506 for displaying augmented environmental data, an environmental data ("ED") sensor 508 for obtaining environmental data including audio and/or visual information representing a physical environment, and a user interface ("U/I") device 510 for receiving user input data associated with one or more action items. According to some embodiments, a user interface device 510 may include some or all of the components described with respect to input/output device 220 above. In some embodiments, environmental data sensor 508 may include a microphone or a digital camera. According to some embodiments, augmented environment processor 502 may include all of the features and functions of processor 210 described above. Further, augmented environment processor 502 may be configured to, based on environmental data obtained from the environmental data sensor, identify one or more action items in the environmental data, augment the environmental data by adding the virtual environmental data comprising enhanced content associated with one or more of the one or more action items, and generate a signal comprising augmented environmental data. Enhanced content may be content that is unrepresented in the physical environment. The augmented environmental data display 506 may be configured to receive the signal comprising augmented environmental data and display the augmented environmental data in accordance with the signal.

According to some embodiments, based on the user input data, the one or more action items, and the user profile information, the input/output device 220 may be configured to provide purchase request data to a merchant terminal 150 to enable a transaction related to the one or more action items, wherein the purchase request data comprises the stored user payment credentials. In some embodiments, receiving user input data may include detecting one or more of a visual command and an auditory command in the user input data and selecting, based on the detection, one or more of the merchant and the set of user credentials.

Figure 3:
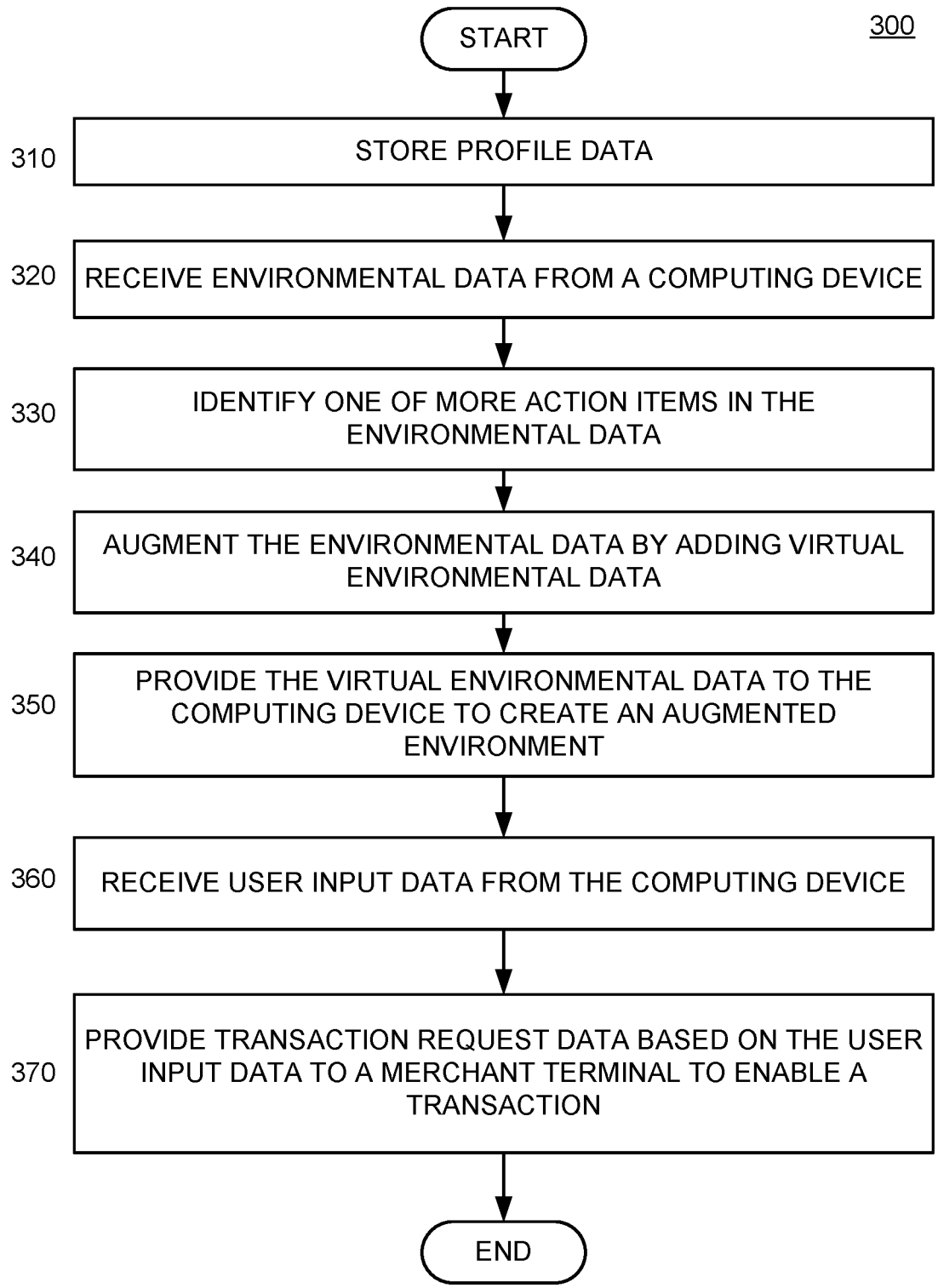
FIG. 3 is a flowchart of an exemplary method for generating an augmented environment and facilitating a transaction.

FIG. 3 shows a flowchart of method 300 for generating an augmented environment and facilitating an action. Method 300 may be performed by service provider terminal 110 using processor 210 to execute memory 230. In some embodiments, one or more steps of method 300 may be delegated to other devices or systems in system 100, such as computing device 120, merchant database terminal 140, merchant POS terminal 150 and/or financial service provider terminal 160. Following method 300, user(s) may generate, share, and modify virtually augmented environments.

In block 310, service provider terminal 110 may store profile data. Profile data may include information such as payment credentials and/or user profile information. Profile data may be entered directly by a user (e.g., via computing device 120 or merchant POS terminal 150), or stored on and retrieved from merchant database terminal 140 or financial service provider terminal 160. Payment credentials may include credit card information, including standard or tokenized versions of the credentials, financial account information (e.g., which may be associated with financial service provider terminal 160) or other financial information as needed to initiate and authorize a payment, while profile information can include delivery locations, billing addresses, previous transactions, other transaction metadata (e.g., location, time, etc.), user preferences for clothing or other product sizes and quantities, and merchant account numbers.

At step 320, service provider terminal 110 may receive environmental data comprising audio and visual information via computing device 120. Having received the environmental data, at step 330 service provider terminal 110 may identify one or more action items in the visual information of the environmental data. Action items can be identified by recognizing shapes (e.g., via 2D or 3D image recognition), bar codes, RFID devices, QR codes, IR-, BLE-, and other beacons located in an environment (e.g., POS devices 152, 154, and 156 associated with one or more products or items at a POS location or devices associated with different predefined areas of a closet, refrigerator, pantry, etc. that stores items that are periodically repurchased), or the like. Examples of action items may include products to be re-ordered, bills to be paid, objects related to bills to be paid or products to be ordered, or the like.

At step 340, service provider terminal 110 may augment the environmental data by adding virtual environmental data. In some embodiments, this augmentation may involve displaying information from a merchant (e.g., who may be associated with merchant database terminal 140 and/or merchant POS terminal 150) that is specific to one of the one or more of the identified action items. For example and not limitation, service provider terminal 110 may recognize a particular item or product and augment the environment with visual effects such as a price tag or bill amount, bill due date, availability of the product and/or products of other brands or sizes, or aesthetic effects such as virtual fireworks, sale signs, colors indicating past due bills or bills due within 24 hours, and the like. Service provider terminal 110 can connect to an appropriate merchant database terminal 140 to include information relevant to the identified action item. For example, in the event that the identified action item is a cable box, service provider terminal 110 may connect to a cable provider database terminal (e.g., merchant database terminal 140), or in the event that the action item is a food item, service provider terminal 110 may connect to a grocery store database terminal (e.g., merchant database terminal 140). In some embodiments, the augmented environmental data may include inventory information or amount information associated with one or more action items. In some embodiments, the service provider terminal 110 may determine, from the environmental data, the number or amount of a product in the environment. For example, the service provider terminal may determine from image analysis that a bottle of ketchup is half empty, or that a box of soda cans only has four cans left. In some embodiments, inventory information or amount information may be gathered from various environmental sensors such as scanners (e.g., barcode or RFID scanners), weight sensors, temperature sensors, or any other type of suitable sensor.

In block 350, service provider terminal 110 may provide the virtual environmental data to computing device 120 in order to create an augmented environment when viewed in combination with the physical environment. In some embodiments, the virtual environment data may include some or all of the environmental data provided by computing device 120. In some embodiments, computing device 120 may only receive the newly generated virtual environmental data. The virtual environmental data may include product price or bill amount information, bill due date, product inventory information, related products (e.g., other brands, sizes, or models), available discounts, and aesthetic visual effects (e.g., target graphics, glow, highlighted colors, or firework graphics displayed around one or more products to draw attention to a particular item or to convey a message associate with that item, such as being highlighted red for a past due bill). In some embodiments, the augmented environment may display inventory information or amount information in association with a particular item. For example, computing device 120 may display that there are four cans of soda left in association with a box of soda cans. According to some embodiments, the service provider terminal 110 may receive data represented of predefined desired inventory or amount levels. For example, a user may specify a minimum inventory level of four soda cans in association with a box of soda cans, such that when the system 100 detects that there are less than four soda cans, the service provider terminal 110 may generate a prompt to buy more soda.

After displaying the augmented environment to a user, computing device 120 may receive user input in response to that augmented environment, and this user input can be communicated to other devices in system 100 (e.g., service provider terminal 110). For example, the user of computing device 120 may touch a screen, make a gesture in the visual field of a video capturing component of computing device 120, speak a command into an audio capturing component of computing device 120, enter an input using a connected input device, or some combination of these. In some embodiments, computing device 120 may be a virtual reality device including a headset and a camera. In such embodiments, the user may be viewing the augmented environment, and may physically reach for an element in that environment to generate user input data. In some embodiments, computing device 120 can be a personal computer, with the augmented environment displayed on a monitor. A user may then select (e.g., using the mouse or other controller, or via motion if a motion sensor or device with an accelerometer is used in cooperation with the computer) a virtual element in the augmented environment to generate user input data. The user input data may then be transmitted to service provider terminal 110 (e.g., by computer device 120 via network 130).

In response to receiving the user input data at block 360, at block 370, service provider terminal 110 may provide transaction request data to the merchant database terminal 140 or merchant POS terminal 150 in order to enable a transaction. In some embodiments, the user input data corresponds with a selection of a product for purchase at a merchant. In some embodiments, the user input data may include a selection of a payment method for a bill or invoice. For example, the user input data may be the user gesturing to press a virtual "reorder" button associated with a food item, and service provider terminal 110 connects to a grocery merchant terminal and provides payment information to complete the transaction with the grocery merchant to order the food item. Similarly, the user input data may be the user gesturing to press a virtual "pay bill" button associated with a cable bill, and service provider terminal 110 connects to a cable merchant terminal and provides payment information to pay the identified bill with the cable merchant.

In some embodiments, to provide the transaction request data, service provider terminal 110 may transmit a purchase authorization request to financial service provider terminal 160, which may already have user account information associated with computing device 120. Once the request has been authorized, service provider terminal 100 may transmit a purchase request to merchant POS terminal 150 to purchase the identified product(s) or to pay the identified bill(s). Alternatively, in other embodiments, service provider terminal 100 may add the identified products or identified bills to a checkout cart associated with computing device 120 for purchase or payment at another time.

Optionally, in some embodiments, system 100 may facilitate another action in lieu of or in addition to making a purchase or paying a bill. For example, system 100 may allow a user to access and interact with (e.g., via computing device 120) one or more billing statements, purchase histories, or other account information associated with the action item identified in block 330, and this account information may be included in the virtual environment data that is provided to computing device 120 at block 350. For example, as a user observes a credit card, system 100 may identify the credit card as an action item, and provide virtual environmental data that includes information related to payment history or a previous statement to computing device 120 to create an augmented environment. Then, via computing device 120, system 100 may receive user input data and, in response, provide action request data to a merchant terminal (e.g., merchant POS terminal 150). Some examples of actions may include saving an item to a shopping list, sharing an item with a friend via a social connection, displaying item information such as ratings or reviews for the item or similar items, and requesting transaction financing such as a merchant credit account or the like.

Figure 4:
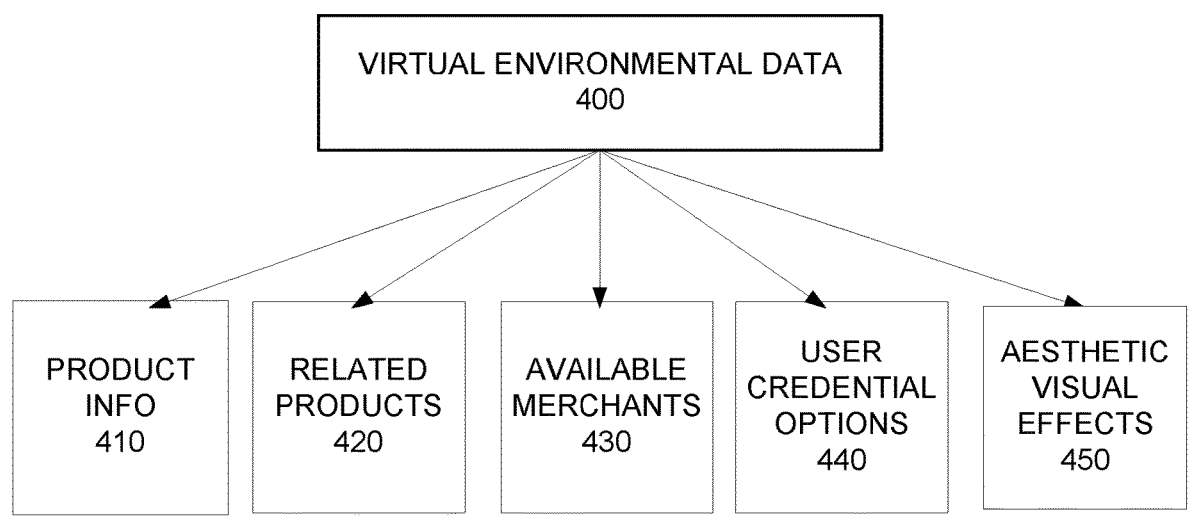
FIG. 4 is a diagram of exemplary types of virtual environmental data.

FIG. 4 shows a diagram that represents an embodiment of exemplary types of virtual environmental data 400. For example, virtual environmental data 400 may include product information 410, related product information 420, product availability between merchants 430, user credential options 440, or aesthetic visual effects 450. Product information 410 can include, for example, a product price, stocking information, product features, and product reviews. Related product information 420 may include complementary products (e.g. batteries for a device, matching tie for a shirt, etc.) or alternative products (e.g. value-sized items, more highly rated alternatives, comparable brands, etc.). Merchant information 430 can include prices, shipping costs, and availability at various merchants, as well as merchant reviews. User credential options 440 can include individual family member profiles (e.g. this is for mom, dad, or child), credit cards, membership numbers (e.g. loyalty programs, frequent flier accounts, etc.), bank account information, or merchant account passwords. Examples of aesthetic visual effects may include product image graphics, glowing effects, highlighting objects with colors, or animations (e.g. firework graphics, waving flags, etc.).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

The following exemplary use case describes one example of a typical user flow pattern. It is intended solely for explanatory purposes and not in limitation. The user may have credit card information and a delivery address stored in the system (e.g., system 100), and may be in their home looking into their kitchen cabinets and refrigerator using their mobile device (e.g., computing device 120). The augmented environment seen by the user (e.g., via computing device 120) may include a series of purchasing options to reorder items in the cabinets and refrigerator that may be empty or near empty. For example, the system may visually identify the contents of the container to be below a certain threshold, or it may connect with sensors either in the containers themselves or in nearby accessories (e.g., fridge), that may sense the weight or fullness of a particular container. The system may include predefined minimum inventory levels or product amounts that may be specified by the user. For example, a user may specify that a predefined minimum number of cans of soup, such as four cans, so that when the system detects that the user has less than four cans of soup in their cupboard, the system (e.g., via computing device 120) may present a prompt to buy more soup. The augmented environment may also provide (e.g., via computing device 120) suggestions of complementary items to complete recipes. Using computing device 120, the user can tap the virtual items to add them to a virtual shopping cart, and then swipe the virtual cart to checkout and order the items in the cart.

Another exemplary use case relates to a bill payment system, whereby a user can use a mobile device (e.g., computing device 120) to view a particular set of items in their home to bring up bill information and apply payments to their accounts. For example, the user could view a lamp in their home to view electric bill information retrieved by the system from a utility database, and pay the bill with a swipe or tap. In this manner, system 100 could receive environmental data including the lamp (e.g., via computing device 120), identify the lamp as an action item (e.g., via service provider terminal 110), retrieve related electric bill information from merchant database terminal 140, and provide an augmented environment (e.g., via computing device 120) that displays electric bill information to the user. Then, upon receiving user input data via computing device 120, service provider terminal 110 may provide a transaction request (e.g., to merchant POS terminal 150) to pay the identified bill. Similarly, the user could then view their cable box to view cable billing information and make payments. Additionally, the user could use the system when opening bills received via email or postal mail, and view additional information in the augmented environment that allows for the scheduling of payment, reminders, or the like. Such a system may allow a user to ensure all bills are paid in a timely manner perhaps by simply remembering to scan their home with their mobile device once or twice a month. The system may also automatically recognize when bills are entering the household, e.g., by scanning or recognizing them at the mailbox, or by scanning electronic mailboxes, e.g., email inbox for incoming bills.

Another exemplary use case relates to using a mobile device (e.g., computing device 120) to view an augmented environment that presents the user with inventory information relating to products being viewed by the user (e.g., products viewed by a camera of computing device 120). As described above, the system may identify an object, such as a box of soda cans in a refrigerator, and the system may determine the inventory of the object, by for example, visually identifying the number of cans in the box or by determining the number of cans present using a weight sensor. Then, every time the user opens the door to their refrigerator, the system (e.g., via computing device 120) may display an augmented environment that shows, in association with the box of soda, that there are, for example, only four cans of soda remaining in the box. In this way, the system (e.g., system 100) may enable the user to passively monitor the inventory or amount of particular items.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A system for facilitating a transaction, comprising:
a memory for storing profile data comprising user payment credentials and user profile information;
an environmental data sensor for obtaining environmental data comprising audio and/or visual information representing a physical environment, the environmental data comprising a gesture made in a visual field of the environmental data sensor;
an input/output device for receiving virtual environmental data comprising data associated with a merchant from a computing device, wherein the input/output device is configured to, based on one or more purchased products, user input data associated with the one or more purchased products, and the user profile information, provide purchase request data to a merchant terminal associated with the merchant to enable a transaction related to the one or more purchased products, wherein the purchase request data comprises the user payment credentials and the user input data comprises a visual command to select the merchant based on the gesture made in the visual field of the environmental data sensor;
an augmented environment processor configured to cause the system to:
detect, based on environmental data obtained from the environmental data sensor, the one or more purchased products and a number of the one or more purchased products in the environmental data by identifying one or more objects present in the visual information using 3D image recognition techniques;
determine that the number of the one or more purchased products is below a predetermined threshold;
augment the environmental data by adding the virtual environmental data comprising enhanced content associated with the one or more purchased products and comprising the number of the one or more purchased products and a prompt to buy more of the one or more purchased products; and
generate a signal comprising the augmented environmental data;
an augmented environmental data display that receives the signal comprising augmented environmental data and displays said augmented environmental data in accordance with the signal; and
a user interface device for receiving the user input data associated with the one or more purchased products.

2. The system of claim 1, wherein the one or more purchased products are one or more canned items.

3. The system of claim 1, wherein one or more weight sensors, one or more volume sensors, the 3D image recognition techniques, or a combination thereof are used to detect the number of the one or more purchased products.

4. A system for facilitating a transaction, comprising:
one or more processors; and a memory in communication with the one or more processors and storing instructions that, when executed by the one or more processors, are configured to cause the system to:
- store profile data comprising user payment credentials and user profile information;
- receive, from a computing device associated with the stored profile data, environmental data comprising audio information and visual information representing a physical environment;
- detect one or more purchased products and a number of the one or more purchased products in the environmental data by identifying one or more objects present in the visual information using 3D image recognition techniques;
- determine that the number of the one or more purchased products present in the environmental data is below a predetermined threshold;
- augment the environmental data by adding virtual environmental data comprising enhanced content associated with one or more of the one or more purchased products, wherein the enhanced content comprises the number of the one or more purchased products present and a prompt to buy more of the one or more purchased products;
- provide, to the computing device, the virtual environmental data to create an augmented environment in combination with the physical environment;
- receive user input data associated with one or more of the purchased products from the computing device, wherein receiving the user input data comprises:
  - detecting a visual command in the environmental data, the visual command comprising a gesture made in a visual field of a video capturing component of the computing device; and
  - selecting, based on the detection of the visual command, a merchant; and
- provide, based on the user input data, the one or more purchased products, and the user profile information, purchase request data to a merchant terminal associated with the merchant to enable a transaction related to the one or more purchased products, wherein the purchase request data comprises the user payment credentials.

5. The system of claim 4, wherein the virtual environmental data comprises product price information, product stock information, related products, available merchants, transaction options, user credential options, aesthetic visual effects, or a combination thereof.

6. The system of claim 4, wherein the computing device comprises a mobile phone, a virtual reality headset, or a personal computer.

7. The system of claim 4, wherein the one or more processors are further configured to execute the instructions to select the merchant terminal based on the one or more objects present in the visual information.

8. The system of claim 4, wherein a set of user credentials is selected based on the one or more objects present in the visual information.

9. The system of claim 8, wherein one of the one or more purchased products is a representative object that is related to the set of user credentials.

10. The system of claim 4, wherein the step of detecting the one or more purchased products further comprises identifying visual indicia in the visual information, and
   wherein the visual indicia comprises a text string, a symbol, a group of symbols, a UPC code, or a QR code.

11. A non-transitory computer-readable medium storing instructions that, when executed by one or more processors, cause a computer system to:
- store profile data comprising user payment credentials and user profile information;
- receive, from a computing device associated with the stored profile data, environmental data comprising audio information and visual information representing a physical environment;
- detect one or more purchased products and a number of the one or more purchase products in the environmental data by identifying one or more objects present in the visual information using 3D image recognition techniques;
- determine that the number of the one or more purchased products in the environmental data is below a predetermined threshold;
- augment the environmental data by adding virtual environmental data comprising enhanced content associated with one or more of the one or more purchased products, wherein the enhanced content comprises the number of the one or more purchased products present and a prompt to buy more of the one or more purchased products;
- provide, to the computing device based on detecting the number of the one or more purchased products, the virtual environmental data to create an augmented environment in combination with the physical environment;
- receive user input data associated with one or more of the purchased products from the computing device, wherein receiving the user input data comprises:
  - detecting a visual command in the environmental data, the visual command comprising a gesture made in a visual field of a video capturing component of the computing device; and
  - selecting, based on the detection of the visual command, a merchant; and
- provide, based on the user input data, the one or more purchased products, and the user profile information, purchase request data to a merchant terminal associated with the merchant to enable a transaction related to the one or more purchased products, wherein the purchase request data comprises the user payment credentials.

12. The non-transitory computer-readable medium of claim 11, wherein the virtual environmental data comprises product price information, product stock information, related products, available merchants, transaction options, user credential options, aesthetic visual effects, or a combination thereof.

13. The non-transitory computer-readable medium of claim 11, wherein the step of detecting the one or more purchased products further comprises identifying visual indicia in the visual information, and
   wherein the visual indicia comprises a text string, a symbol, a group of symbols, a UPC code, or a QR code.

14. The non-transitory computer-readable medium of claim 11, wherein the one or more purchased products are one or more canned items.

15. A method of facilitating a transaction, comprising:
- storing profile data comprising user payment credentials and user profile information;
- receiving, from a computing device associated with the stored profile data, environmental data comprising audio information and visual information representing a physical environment;

detecting one or more purchased products and a number of the one or more purchased products in the environmental data by identifying one or more objects present in the visual information using 3D image recognition techniques;

determining that the number of the one or more purchased products in the environmental data is below a predetermined threshold;

augmenting the environmental data by adding virtual environmental data comprising enhanced content associated with the one or more of the one or more purchased products, wherein the enhanced content comprises the number of the one or more purchased products present and a prompt to buy more of the one or more purchased products;

providing, to the computing device based on the number of the one or more purchased products, the virtual environmental data to create an augmented environment in combination with the physical environment;

receiving user input data associated with one or more of the purchased products from the computing device, wherein receiving the user input data comprises:

detecting a visual command in the environmental data, the visual command comprising a gesture made in a visual field of a video capturing component of the computing device; and selecting, based on the detection of the visual command, a merchant; and providing, based on the user input data, the one or more purchased products, and the user profile information, purchase request data to a merchant terminal associated with the merchant to enable a transaction related to the one or more purchased products, wherein the purchase request data comprises the user payment credentials.

16. The method of claim 15, wherein the virtual environmental data comprises product price information, product stock information, related products, available merchants, transaction options, user credential options, aesthetic visual effects, or a combination thereof.

17. The method of claim 15, wherein detecting the one or more purchased products further comprises identifying visual indicia in the visual information, and wherein the visual indicia comprises a text string, a symbol, a group of symbols, a UPC code, or a QR code.

18. The method of claim 15, wherein one of the one or more purchased products is a representative object that is related to a set of user credentials.

\* \* \* \* \*